US006443424B1

(12) United States Patent
Parr et al.

(10) Patent No.: US 6,443,424 B1
(45) Date of Patent: Sep. 3, 2002

(54) CLUTCH ARM CENTERING DEVICE

(75) Inventors: Robert Parr, Toronto; Sanjay Sood, North York; William Dimopoulos, Whitby, all of (CA)

(73) Assignee: Atlas Polar Company Limited, Toronto (CA)

( * ) Notice: Subject to any disclaimer, the term of this patent is extended or adjusted under 35 U.S.C. 154(b) by 0 days.

(21) Appl. No.: 09/573,167

(22) Filed: May 19, 2000

(51) Int. Cl.[7] ................................................ F16K 51/00
(52) U.S. Cl. ........................ 251/279; 267/150; 251/337
(58) Field of Search .......................... 267/150; 251/279, 251/58, 129.12, 129.11, 337; 137/625.65

(56) References Cited

U.S. PATENT DOCUMENTS 2,429,313 A * 10/1947 Gilbert ....................... 267/150
2,770,832 A * 11/1956 Martin ....................... 267/150
3,117,771 A * 1/1964 Herr et al. .................. 267/150
3,356,357 A * 12/1967 Levine ....................... 267/150
3,559,817 A 2/1971 Brown
3,963,051 A 6/1976 Kuhlmann
3,990,352 A 11/1976 Nishida et al.
4,109,771 A 8/1978 Strong
4,240,304 A 12/1980 Griffiths
4,261,451 A 4/1981 Strong
4,422,619 A 12/1983 Griffiths
4,438,660 A * 3/1984 Kittle ......................... 267/150
4,447,044 A 5/1984 Nakata
4,526,342 A * 7/1985 Wakefield .......... 137/625.65 X
5,343,775 A * 9/1994 Easton et al. ............... 267/150
6,032,760 A * 3/2000 Jorgenson ................... 267/150

* cited by examiner

*Primary Examiner*—Lesley D. Morris
*Assistant Examiner*—John Bastianelli
(74) *Attorney, Agent, or Firm*—Bereskin & Parr

(57) ABSTRACT

A clutch arm centering device is disclosed. The device is mounted on a clutch using to operate piston valves on a crane or other heavy machine. The piston valves may be operated using a valve arm which has two operative positions and a neutral position between the two operative positions. A clutch arm of the clutch is linked to valve arm to allow the valve arm to be manipulated by a remote control coupled to the clutch. As parts of the linkage between the clutch arm and the valve arm wear, the centering device biases the clutch arm to a central position which corresponds to the neutral position of the valve arm, thereby avoiding problems of understroking and overstroking which arise in the prior art.

7 Claims, 10 Drawing Sheets

CLUTCH ARM CENTERING DEVICE

FIELD OF THE INVENTION

This invention relates to clutches used to remotely control the operation of hydraulic or pneumatic valves, such as the control valves of a crane or other apparatus. More particularly, the invention relates to a device for centering a clutch arm of such a clutch to reduce the effect of mechanical wear on its operation.

BACKGROUND OF THE INVENTION

Many heavy lifting machines, such as cranes, and heavy earth moving machines, such as backhoes and excavators, use hydraulic pistons to power the movement of their various parts. Each of these hydraulic pistons is usually controlled by a hydraulic valve, which may be operated by a valve arm that can stroke the valve in two opposing directions to either extend or contract the associated hydraulic piston.

The valve arm may be operated by using a direct manual control or by a remote control. Manual operation is done by directly manipulating the valve arm (i.e. by raising and lowering or by moving it from side to side) by means of a handle. Remote operation is often accomplished by using a mechanical, electromechanical or electromagnetic clutch to couple a drive motor usually through a gear box to the valve arm. A remote control device may be used to manipulate the motor, thereby operating the valve arm.

Over time, linkages coupling the clutch to the valve arm may wear, causing a mechanical deadband to develop. The clutch arm will tend to sag downward (or to one side) due to gravity or another force. When the remote control device is used to manipulate the valve arm by raising it, the mechanical deadband reduces the effective distance by 30 which the valve arm is raised, producing an understroked response. When the remote control device is used to manipulate the valve arm by lowering it, the motor will overstroke the valve arm and try to force it past its maximum position. As a result, the valve arm may be damaged. Alternatively, the valve arm may be stopped by a dead stop and the clutch, the motor or the gear box may be damaged.

To deal with the problems caused by this sagging and the resulting mechanical deadband, attempts have been made to increase the range by which the remote control may manipulate the valve arm. This permits the motor to raise the valve arm a greater distance and thereby addresses the problem of understroking in one direction. However, this solution has no effect on the problem of overstroking in the opposite direction. Furthermore, this solution may require repetitive adjustment of the range by which the remote control may manipulate the valve arm, to avoid overstroking in both directions when the clutch and the associated linkages are new, and then to avoid understroking as the linkages wear.

Accordingly, there is a need for a device to reduce the effect of the mechanical deadband which results from wear on the linkage parts between the clutch and the valve arm.

SUMMARY OF THE INVENTION

The present invention provides a clutch arm centering assembly which biases a clutch arm of a clutch to a fixed neutral position. The clutch arm is coupled to a valve arm which controls a piston. As parts of the clutch arm wear, the clutch arm centering assembly ensures that the clutch arm does not sag, thereby avoiding problems relating to understroking and overstroking.

In one embodiment of a clutch arm centering assembly according to the present invention, a coil spring provides a lifting force to the clutch arm to prevent it from sagging as the coupling wears.

In a second embodiment of a clutch arm centering assembly according to the present invention, a helical spring is mounted to a hub attached to the clutch. The helical spring has a pair of spring arms which engage a centering pin fastened to the clutch arm from opposing sides to bias the clutch arm into a central position.

According to one aspect of the present invention, there is provided a clutch having a clutch arm coupled through a linkage to a valve arm of a valve, said valve arm having a neutral position in which said valve is closed and a first operative position in which said valve is open, said clutch arm having a first position corresponding to said neutral position and having a second position corresponding to said first operative position, said linkage tending to wear in use such that said clutch arm sags away from one of said first and second positions, and a positioning spring coupled to said clutch arm for biasing said clutch arm towards said one position.

According to another aspect of the present invention, there is provided a clutch having a clutch arm coupled to a valve arm of a valve, said valve arm having a neutral position in which said valve is closed and two operative positions one on each side of said neutral position, said clutch arm having a first position corresponding to said neutral position and having second and third positions on opposite sides of said neutral position corresponding to said two operative positions respectively of said valve, and a positioning spring coupled to said clutch arm for biasing said clutch arm towards said first position.

BRIEF DESCRIPTION OF THE DRAWINGS

An exemplary embodiment of the present invention will now be described with reference to the drawings, in which.

DETAILED DESCRIPTION OF THE PREFERRED EMBODIMENT

Figure 2:
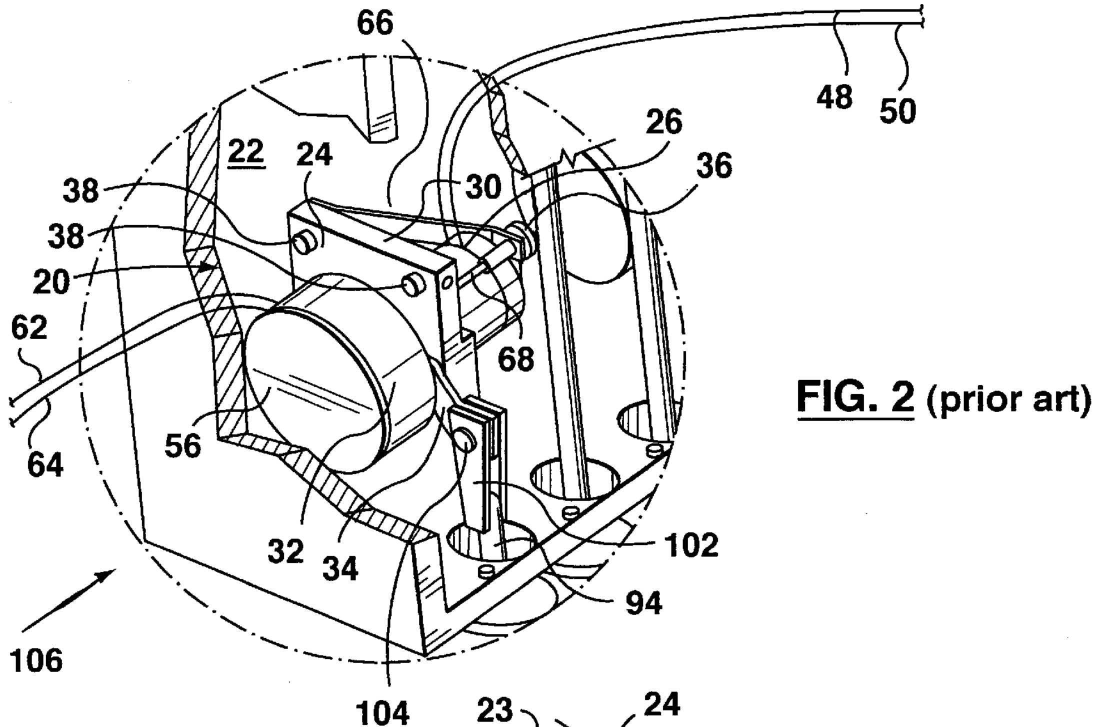
FIG. 2 (prior art)
FIG. 2 is an enlarged view of a portion of FIG. 1.
Figure 1:
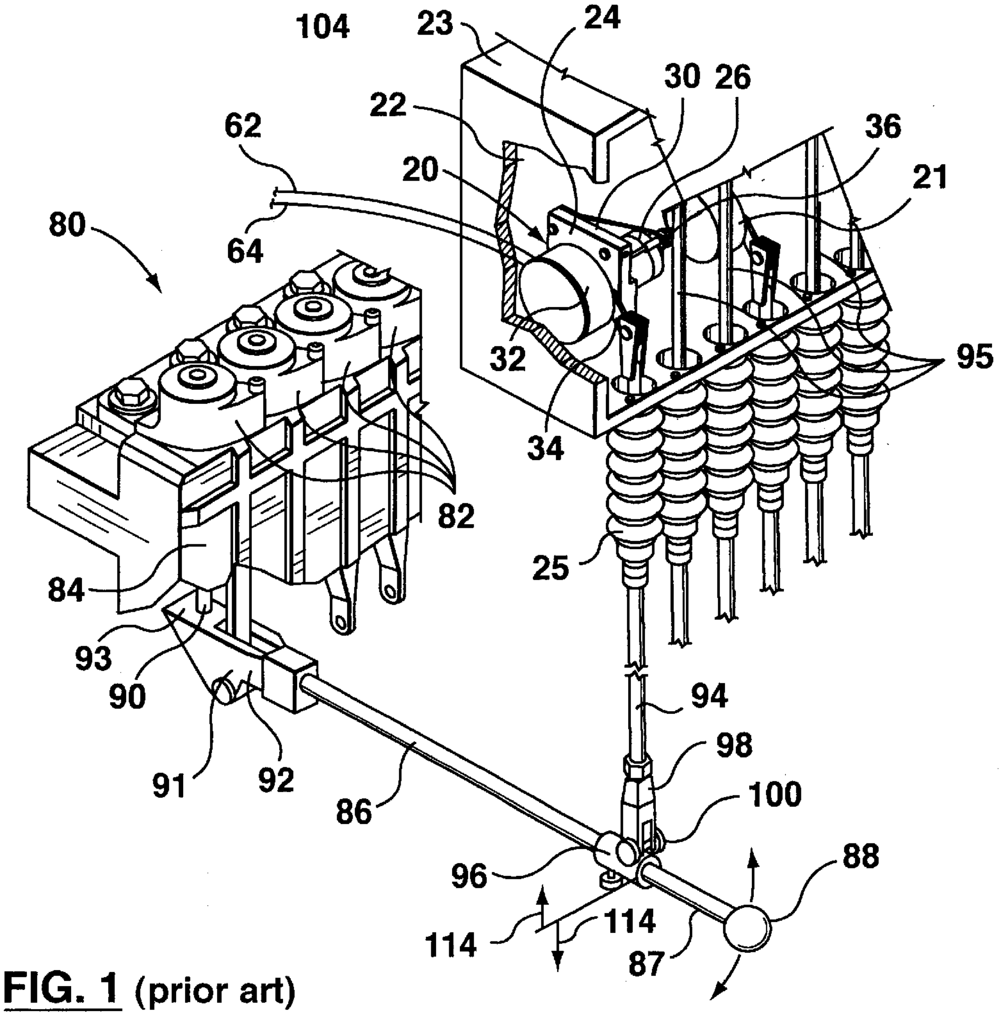
FIG. 1 (prior art)
FIG. 1 is a perspective view of a prior art clutch assembly mounted in a crane.
Figure 3:
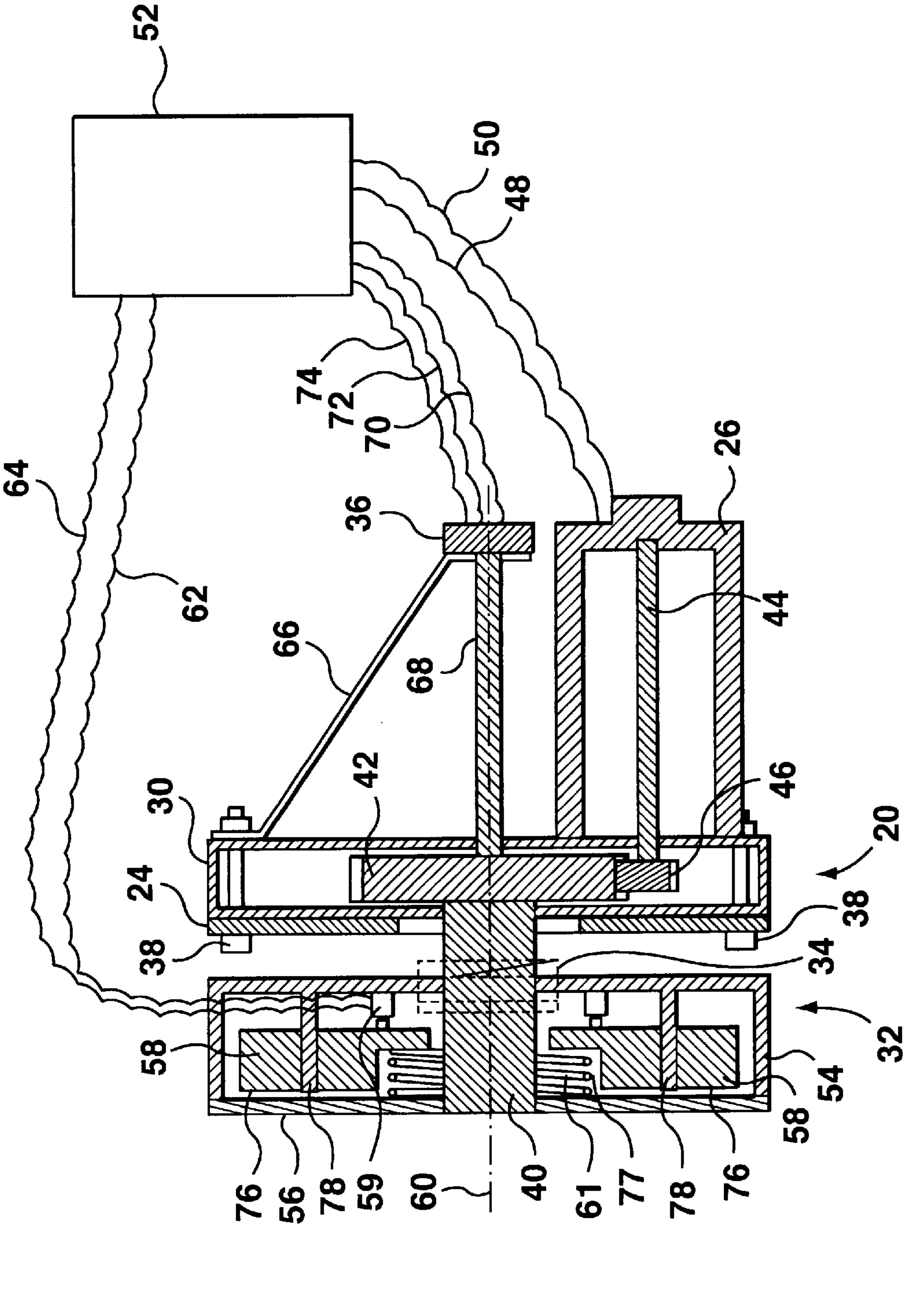
FIG. 3 (prior art)
FIG. 3 is a sectional view of the clutch assembly of FIG. 1.

Reference is first made to FIGS. 1, 2 and 3, which illustrate a prior art clutch assembly 20 mounted on a support member 22 of a crane not shown). Clutch assembly 20 includes a mounting plate 24, a motor 26, a gear box 30, a clutch 32 and a clutch arm 34 and potentiometer 36.

Support member 22 is a part of the crane (not shown) and is typically a strong member which can hold clutch assembly 20 securely. Typically support member 22 will be an enclosed protective box 23 which protects components contained within it. Mounting plate 24 is mounted to support member 22 and provides a base for the remaining parts of clutch assembly 20.

Gear box 30 is fastened to mounting plate 24 by means of fasteners 38, which may be screws or nuts and bolts. Gear box 30 has a shaft 40 (FIG. 3) which is coupled to a large gear 42 inside gear box 30. Motor 26 is mounted to gear box 30 and a shaft 44 of motor 26 extends into gear box 30. The shaft of motor 26 is coupled to a small gear 46 inside gear box 30. Large gear 42 and small gear 46 cooperate within gear box 30 such that when the shaft 44 of motor 26 is rotated, shaft 40 of gear box 30 is also rotated. The gear ratio is selected such that a large rotation of the shaft 44 (i.e. 10 turns or 3600 degrees) produces only a small rotation of shaft 40 (i.e. 30 degrees). Motor 26 is coupled to control system 52 through a pair of control wires 48, 50. Control system 52 controls the rotational motion of shaft 44 by applying an electrical control signal across control wires 48, 50. Control system 52 may be a conventional wired remote controller or a wireless remote controller which permits an operator to view the operation of the crane from different positions while operating the crane.

Shaft 40 of gear box 30 extends through mounting plate 24 and through clutch 32. Clutch 32 is a conventional electromechanical clutch and has a clutch housing 54 and a fixed plate 56, a free plate 58, a solenoid 59 and a spring 61. Fixed plate 56 is mounted to shaft 40 such that fixed plate 56 rotates in fixed relation to shaft 40. Free plate 58 is slideably mounted to pegs 78 which extend from clutch housing 54 such that free late 58 rotates in fixed relation to clutch housing 54. Free plate 58 may slide towards fixed plate 56 such that an engagement portion 76 of free plate 58 frictionally engages fixed plate 56. When fixed plate 56 and free plate 58 are frictionally engaged or "locked", and free plate 58 rotates in fixed relation to free plate 56. Clutch housing 54, free plate 58, fixed plate 56, shaft 40 and large gear 42 share a common axis of rotation 60. Solenoid 59 is positioned between clutch housing and free plate 58 such that it may selectively bias free plate 58 against fixed plate 56 such that fixed plate 56 and free plate 58 become locked. Solenoid 59 is coupled to control system 52 through control wires 62, 64. Spring 61 is positioned between fixed plate 56 and free plate 58 to bias fixed plate 56 and free plate 58 away from one another, as shown in FIG. 3. When fixed plate 56 and free plate 58 are engaged, spring 61 is compressed within a spring well 77 of free plate 58.

Clutch 32 may be in an "engaged" state or a "disengaged" state. In the engaged state, fixed plate 56 and free plate 58 are frictionally engaged together and rotate in fixed relation to one another. In the disengaged state, free plate 58 may rotate freely irrespective of the rotation of fixed plate 56. At all times, free plate 58 is slideably mounted on pegs 78. At most times, clutch 32 will be in the disengaged state. Control system 52 may switch clutch 32 into the engaged state by applying an electric signal to control lines 62, 64. In response to this electric signal, solenoid 59 forces fixed plate 56 against free plate 58, causing the two plates to become mechanically engaged. When the electric signal is removed, spring 61 forces fixed plate 56 and free plate 58 apart, returning clutch 32 to its disengaged state.

Potentiometer 36 is rigidly attached to mounting plate 24 by means of a mounting arm 66, which may be rigidly attached to gear box 30 or mounting plate 24 or which may be formed integrally with mounting plate 24. Potentiometer 36 has a shaft 68 which is coupled to large gear 42 of gear box 30 such that shaft 68 rotates on axis 60 in fixed relation to large gear 42. Potentiometer 36 is coupled to control system 52 by lines 70, 72, 74. Control system 52 may determine the angular position of shaft 68 through lines 70, 72, 74 in known manner. Fixed plate 56 is rigidly coupled to shaft 68 through shaft 40 and large gear 42. This allows control system 52 to determine the angular position of fixed plate 56 and of clutch housing 54.

Clutch arm 34 is rigidly fastened to clutch housing 54 such that clutch arm 34 revolves in fixed relation to the rotation of clutch housing 54.

Cranes and other heavy equipment often have moving parts which are operated with hydraulic or pneumatic pistons. Each of these pistons may be operated by a piston valve which controls the flow of hydraulic or pneumatic fluid into and out of the piston.

Referring to FIG. 1, a piston valve bank 80 is shown. Piston valve bank 80 is firmly attached to the crane (not shown) of the present prior art embodiment. Piston valve bank 80 includes a plurality of hydraulic piston valves 82, each of which is coupled to a piston (not shown) of the crane (not shown). Piston valve 84 has a valve arm 86 and a valve pin 90. Valve arm 86 is mounted to a standoff 91 using a clevice 92, allowing valve arm 86 to be raised and lowered. Valve pin 90 is spring mounted to extend from the bottom of piston valve 90. Valve pin 90 controls the flow of hydraulic fluid into and out of piston valve 84. Clevice 92 has a cam portion 93 which is biased against valve pin 90 and controls the position of valve pin 90 with respect to piston valve 84. Valve arm 86 and valve pin 90 cooperate to control piston valve 84.

Normally, valve arm 86 sits in a central or "neutral" position 87. When valve arm 86 is raised using handle 88, valve pin 90 extends further from piston valve 84 and piston valve 84 operates its associated piston in one direction. When valve arm 86 is lowered, valve pin 90 is pushed further into piston valve 84 and piston valve 84 operates its associated piston in the opposite direction.

Valve arm 86 is coupled to the lower end of a drive rod 94 by means of a clamp 96, a device 98 and a clevice pin 100. The upper end of drive rod 94 is coupled within protective box 23 to clutch arm 34 by means of a device 102 and a device pin 104. Where drive rod 94 enters protective box 23, it is enclosed in a protective bellows 25, which inhibits dirt and other contaminants from entering protective box 23. Valve arm 86, drive rod 94 and clutch arm 34 are coupled such that clutch arm 34 extends horizontally when valve arm 86 is in its neutral position.

FIG. 1 shows additional clutch assemblies 21, and drive rods 95 which are used to operate other piston valves 82.

Piston valve 84 (and the associated piston) may be operated by directly manipulating valve arm 86 (the "direct manual" operation mode) or by remote (the "remote" operation mode).

The direct manual operation mode corresponds to the disengaged state of clutch 32. In this state, clutch housing 54 is free to move regardless of the movement of fixed plate 56. An operator may raise or lower valve clutch arm 86 by moving handle 88, operating the piston valve 84 and the associated piston (not shown).

The remote operation mode corresponds to the engaged state of clutch 32. The remote operation mode is entered when an operator configures control system 52 to operate piston valve 84 and its associated piston. Control system 52 generates an electric signal across control wires 62, 64. Solenoid 59 causes fixed plate 56 and free plate 58 to become mechanically engaged in response to this electric signal. The operator may then dynamically move the piston by varying a control device, such as a knob or lever (not shown), on control system 52. In response to the operator's manipulation of the control device, control system 52 generates a control signal on control wires 48, 50 to rotate shaft 44 of motor 26, thereby causing clutch housing 54 to rotate about axis 60. Control system 52 may cause clutch housing 54 to rotate clockwise or counterclockwise, when viewed from the direction of arrow 106.

Figure 4:
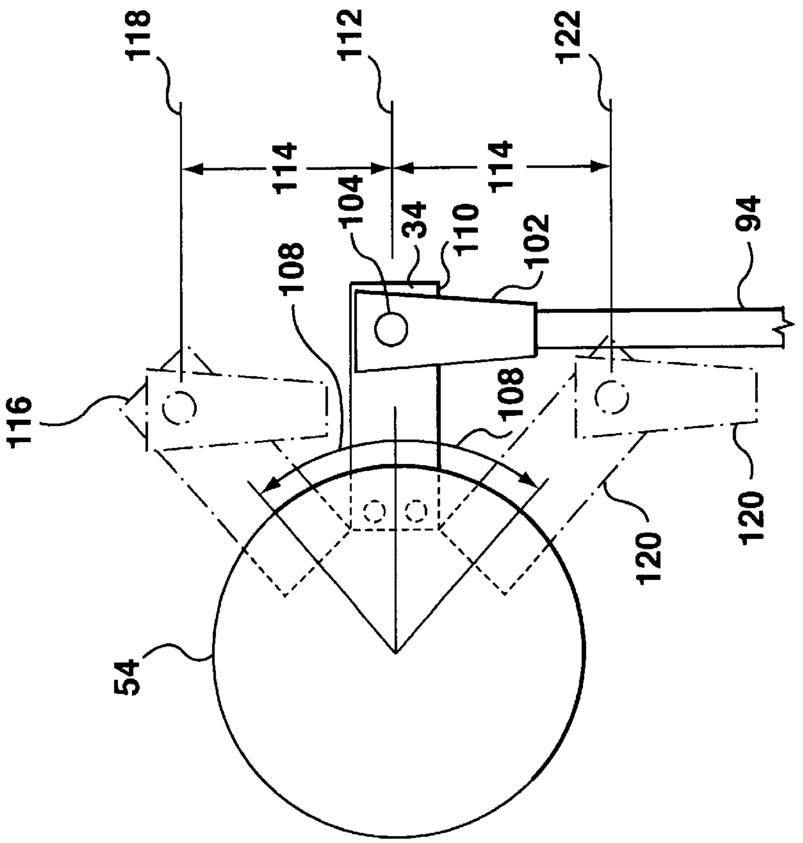
FIG. 4 (prior art)
FIG. 4 is a side elevational view of part of the clutch assembly FIG. 1.
Figure 7:
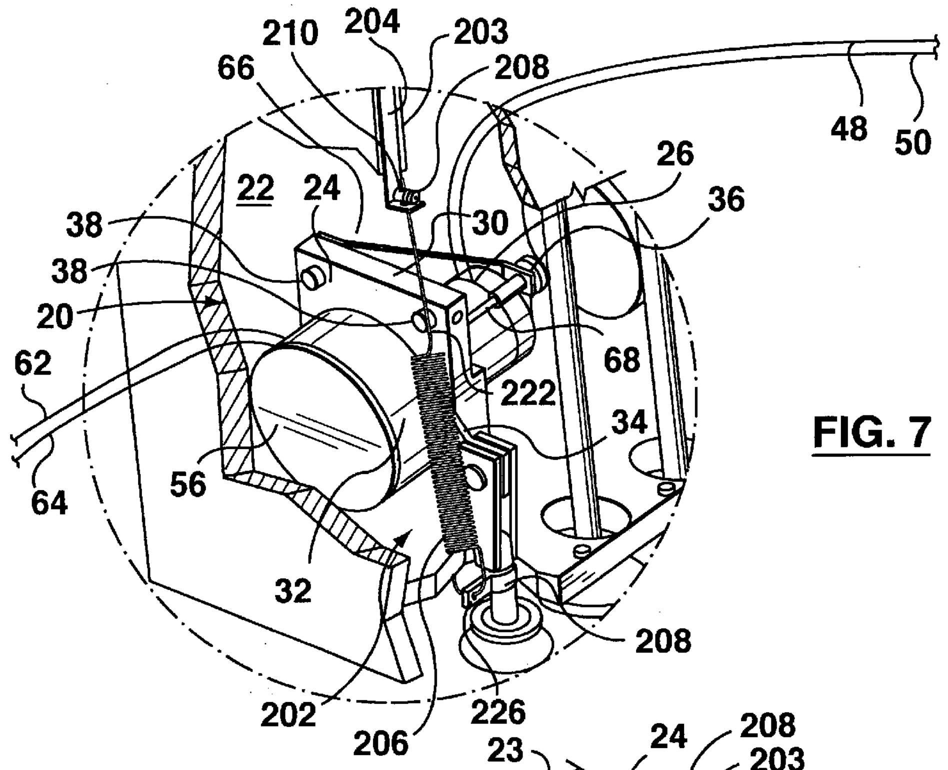
FIG. 7 is an enlarged view of a portion of FIG. 6.
Figure 6:
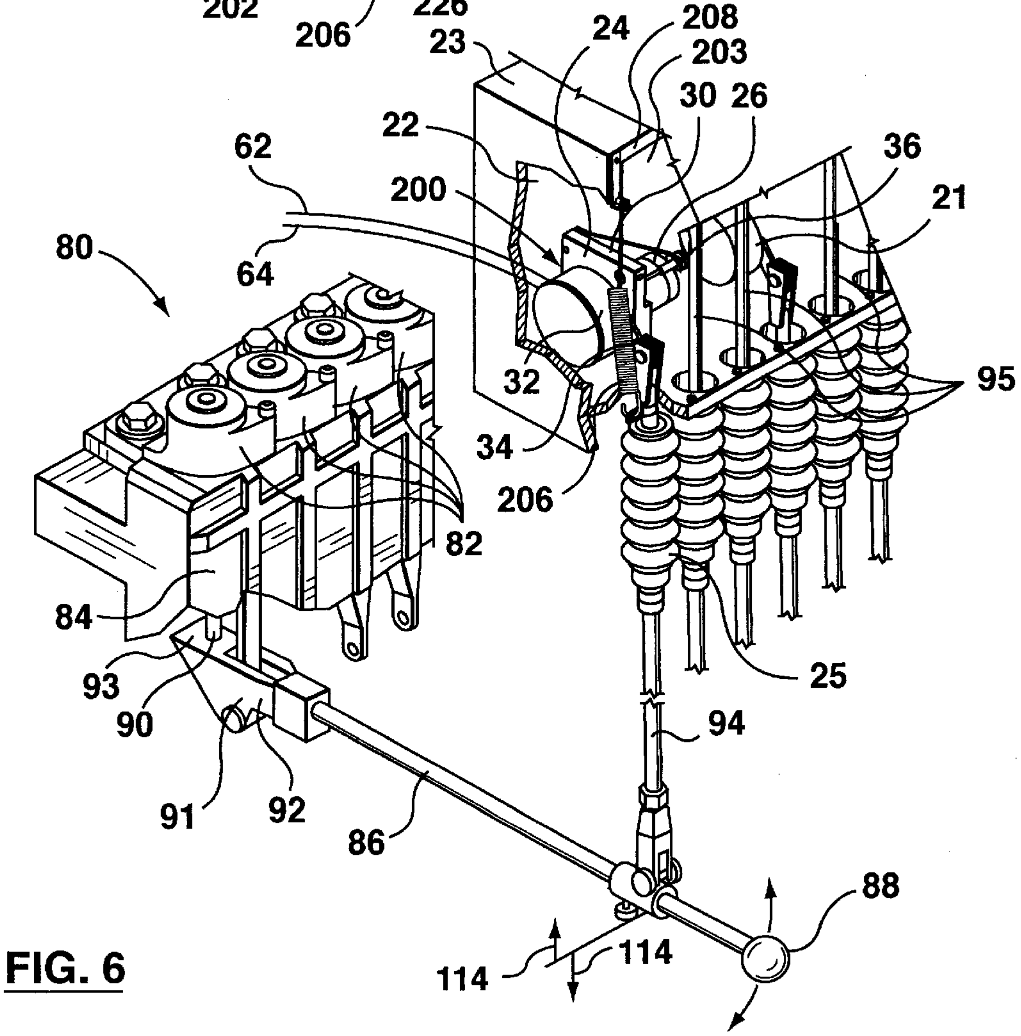
FIG. 6 is a perspective view of a clutch assembly incorporating first embodiment of a clutch arm centering assembly according to the resent invention.

Reference is next made to FIG. 4, which is a side elevational view of clutch housing 54 and clutch arm 34 from the direction of arrow 106 (FIG. 2). When valve arm 86 is in its neutral position, clutch arm 34 will be in a horizontal position 110. In this position, clutch arm 34 has a height 112, measured between the centre of device pin 104 and a reference point such as the ground surface (not shown) on which the crane of the present example is resting. When clutch housing 54 is rotated counterclockwise by an angle 108, clutch arm 34 will be rotated to the position shown at 116. Drive rod 94 and valve arm 86 will be raised by a distance 114 from its initial height 112 to height 118. This has the same effect as if an operator had raised valve arm 86 (FIG. 1) by distance 114 by raising handle 88 in the direct manual operation mode. When clutch housing 54 is rotated clockwise by angle 108 to the position shown at 120, drive rod 94 and valve arm 86 (FIG. 1) will be lowered by distance 114 from its initial height 112 to height 122. This has the same effect as if an operator had lowered valve arm 86 the same distance 114 by lowering handle 88 in the direct manual operation mode. In the remote operation mode, the operator may manipulate the control device of control system 52 such that valve arm 86 is raised or lowered from its neutral position by any distance between zero and distance 114.

Reference is made to FIG. 1. Distance 114 represents the maximum distance that valve arm 86 may be raised, whether in the direct manual operation mode or in remote control operation mode. When valve arm 86 is raised or lowered by distance 114, piston valve 84 operates its associated piston at the maximum speed. Any further displacement of valve arm 86 will not result any change in the operation of the piston valve 84 or the associated piston. However, this may result in damage to the valve arm 86. For example, as valve arm 86 is lowered more than distance 114, device 92 will initially push valve pin 90 into piston valve 84. When valve arm 86 has been lowered by distance 114, valve pin 90 will be fully inserted into piston valve 84 and device 92 will be pressing against the bottom surface of piston valve bank 80, limiting the rotational movement of device 92. If additional downward force is applied to valve arm 86, valve arm 86 may bend or break. Typically, a movement limitation device or a "dead stop" (not shown) is installed to prevent valve arm 86 from being lowered more than distance 114 to avoid this problem. Accordingly, the minimum height that clutch arm 34 may have is height 122. In addition, control system 52 is configured to limit the movement of clutch housing 54 so that it is not rotated by an angle greater than angle 108 and clutch arm 34 is not raised or lowered more than distance 114 from its initial height 112.

Figure 5:
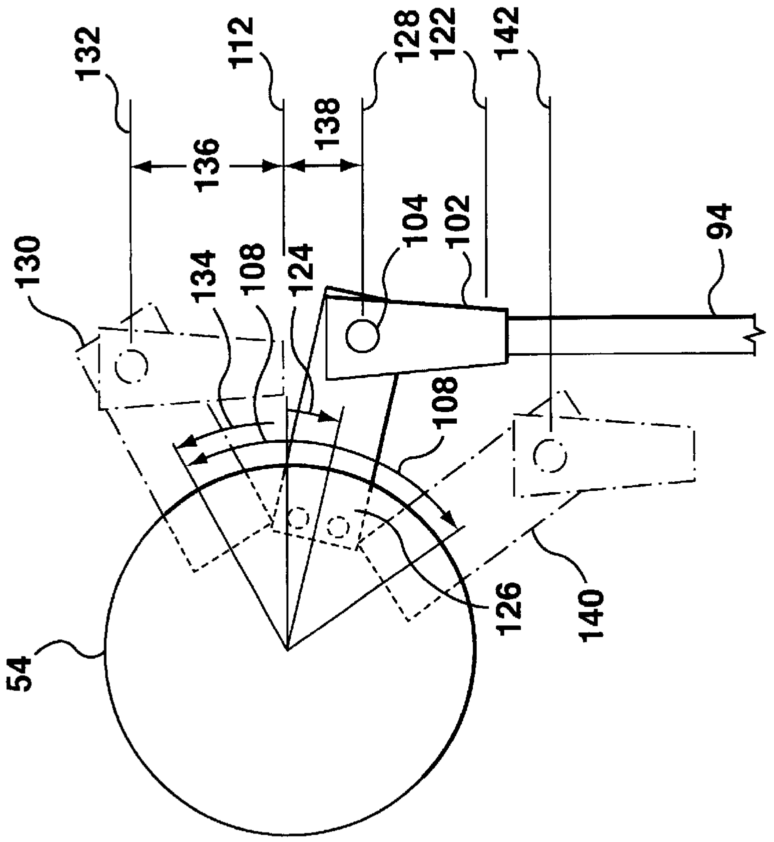
FIG. 5 (prior art)
FIG. 5 is a side elevational view of part of the clutch assembly FIG. 1 after it has become worn.

Prior art clutch assembly 20 has so far been described in its "new" condition, in which it has not deteriorated through wear. Reference is next made to FIG. 5, which shows prior art clutch assembly 20 when valve arm 86 (FIG. 1) is in its neutral position, after clutch assembly 20 has become worn due to use. Over time, various components which link clutch assembly 20 to piston valve 84 will wear. For example, components such as devices 98, 102 and their associated device pins 100, 102 and drive rod 94 may wear down through usage. As these components wear, clutch arm 34 will begin to sag with respect to valve arm 86 (FIG. 1).

In FIG. 5, clutch housing 54 is shown sagging down by an angle 124. Clutch housing 54 is now centered about line 126 and clutch arm 34 has a height 128. The utility of clutch assembly 20 for controlling the operation of piston valve 84 is substantially reduced as a result of this wear.

When an operator attempts to raise valve arm 86 to its maximum height (height 118 in FIG. 4) using clutch assembly 20, control system 52 will rotate clutch housing 54 counterclockwise by angle 108 to position 130, thereby raising clutch arm from height 128 to height 132. During the first part of this rotation, while clutch arm 34 is raised from a distance 138 from height 128 to height 112, the effect of clutch housing 54 having sagged by angle 124 is reversed. This part of the rotation does not affect the position of valve arm 86 (FIG. 1) from its neutral position. Distance 138 represents a mechanical deadband that has been created by the wear described above. During the remainder of the rotation, shown as angle 134, clutch arm 34 is raised by a distance 136 to a height 132. Valve arm 86 (FIG. 1) is also raised by distance 136. Distance 136 is substantially less than distance 114. As a result, piston valve 84 (FIG. 1) is not opened to its maximum position and does not operate its associated piston at the maximum speed which is achieved when valve arm 86 is raised by distance 114. In this condition, clutch assembly 20 may be said to be "understroking" piston valve 84 (FIG. 1).

When an operator attempts to lower valve arm 86 to its minimum height 122 using clutch assembly 20, control system 52 will attempt to rotate clutch housing 54 clockwise by angle 108 to position 140. In this position, clutch arm 34 would have a height 142, which is lower than the minimum height 122 that clutch arm 34 is permitted to have. A dead stop (not shown but described above) may operate to prevent clutch arm from being lowered below height 122. If control system 52 operates motor 26 (FIG. 1) to continue to try to rotate clutch housing 54 to position 140, motor 26 or gear box 30 (FIG. 1) may break. In practice, it has been found that gear boxes often break in these conditions. Alternatively, if motor 26 successfully forces clutch arm 34 to position 140, this will likely break either drive rod 94 or valve arm 84 or both. In this condition, clutch assembly 20 may be said to be "overstroking" piston valve 84 (FIG. 1).

Reference is next made to FIGS. 6, 7, 8 and 9, which show a clutch assembly 200 equipped with a first embodiment of a clutch arm centering assembly 202. Clutch arm centering assembly 202 comprises a bracket 204, a spring 206, a spring clamp 208, and a drive rod clamp 210. Clutch assembly 200 is identical to prior art clutch assembly 20 and components of clutch assembly 200 are given the same reference numerals as their counterparts in clutch assembly

20. Furthermore, clutch assembly 200 is coupled to valve arm 86 of valve piston 84 in the same manner as prior art clutch assembly 20 using devices 98, 102 and drive rod 94.

The present embodiment of clutch assembly 200 and centering assembly 202 are mounted on a support member 203. Bracket 204 is secured to a support member 203, which is positioned generally above clutch housing 54. Bracket 204 is secured to the crane by means of a bolt hole 212 and a bolt 214. Alternatively, any other fastener may be used, including a screw or a weld.

A lower end 216 of bracket 204 is formed at an angle from the central portion 218 of bracket 204. Spring 206 is a helical spring with mounting rod 220 extending from its upper end. Mounting rod 220 is formed integrally with spring 206, although it could be formed separately and then fastened to spring 206. Mounting rod 220 passes through an opening 222 in the lower end 216 of bracket 204 and is held in place by an adjustable spring clamp 208. The lower end of spring 206 is formed into a hook 224. Drive rod clamp 208 is frictionally mounted to drive rod 94 adjacent to device 102 by means of a fastener 226, which may be a nut and bolt combination. Hook 224 extends through an opening 228 in spring clamp 208.

Figure 8:
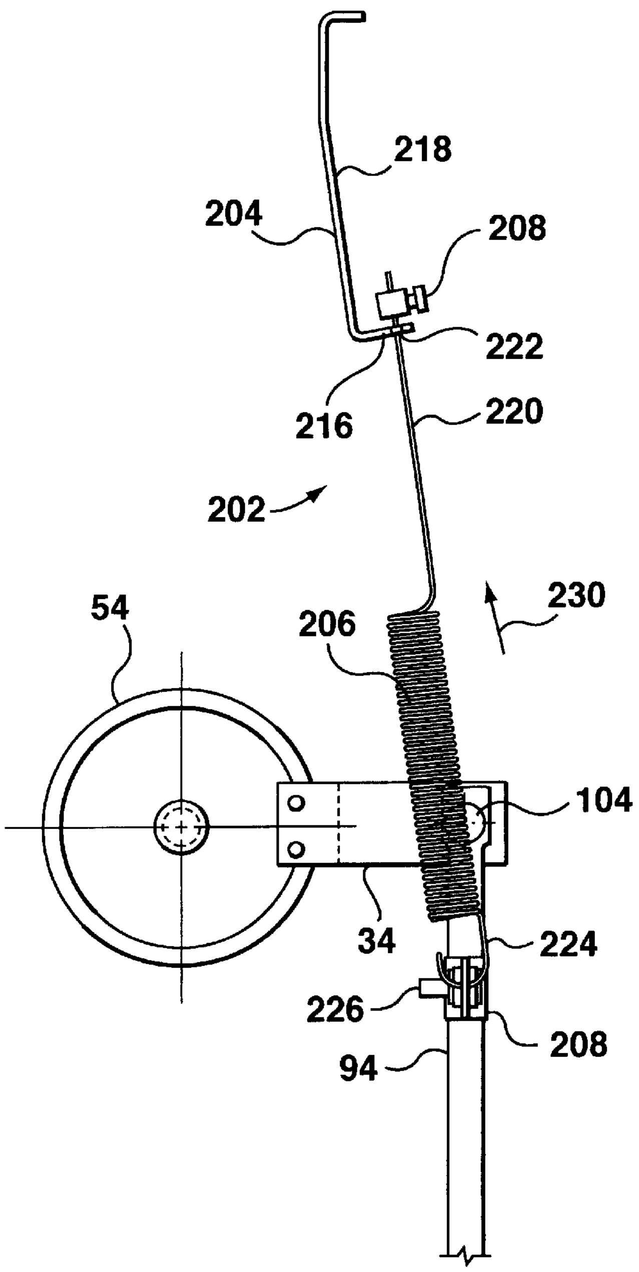
FIG. 8 is a side elevational view of the clutch arm centering assembly of FIG. 6.
Figure 9:
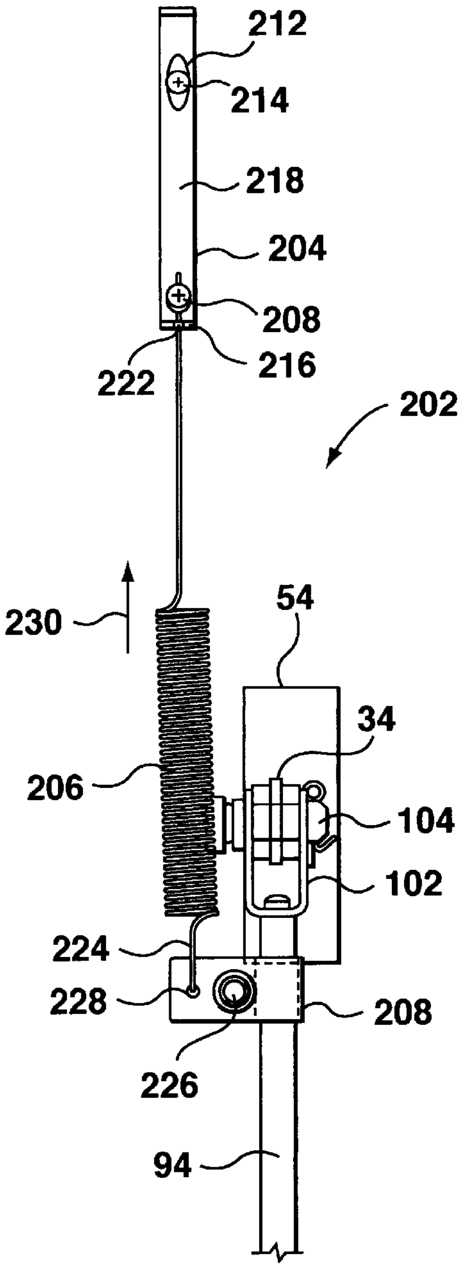
FIG. 9 is another side elevational view of the clutch arm centering assembly FIG. 6.

FIGS. 8 and 9 show clutch arm 34 extending horizontally from clutch housing 54. As described above in relation to prior art clutch assembly 20, this is the position clutch arm 34 will have when valve arm 86 is in its neutral position. When spring 208 is initially installed, it is positioned, using spring clamp 208, such that it holds clutch arm 34 in the desired horizontal position. Spring 206 is selected to provide sufficient spring force 230 to prevent clutch arm 34 from sagging as devices 98, 102, clevice pins 100, 104, drive rod 94 and other components linking clutch assembly 200 to valve arm 84 wear.

Figure 10:
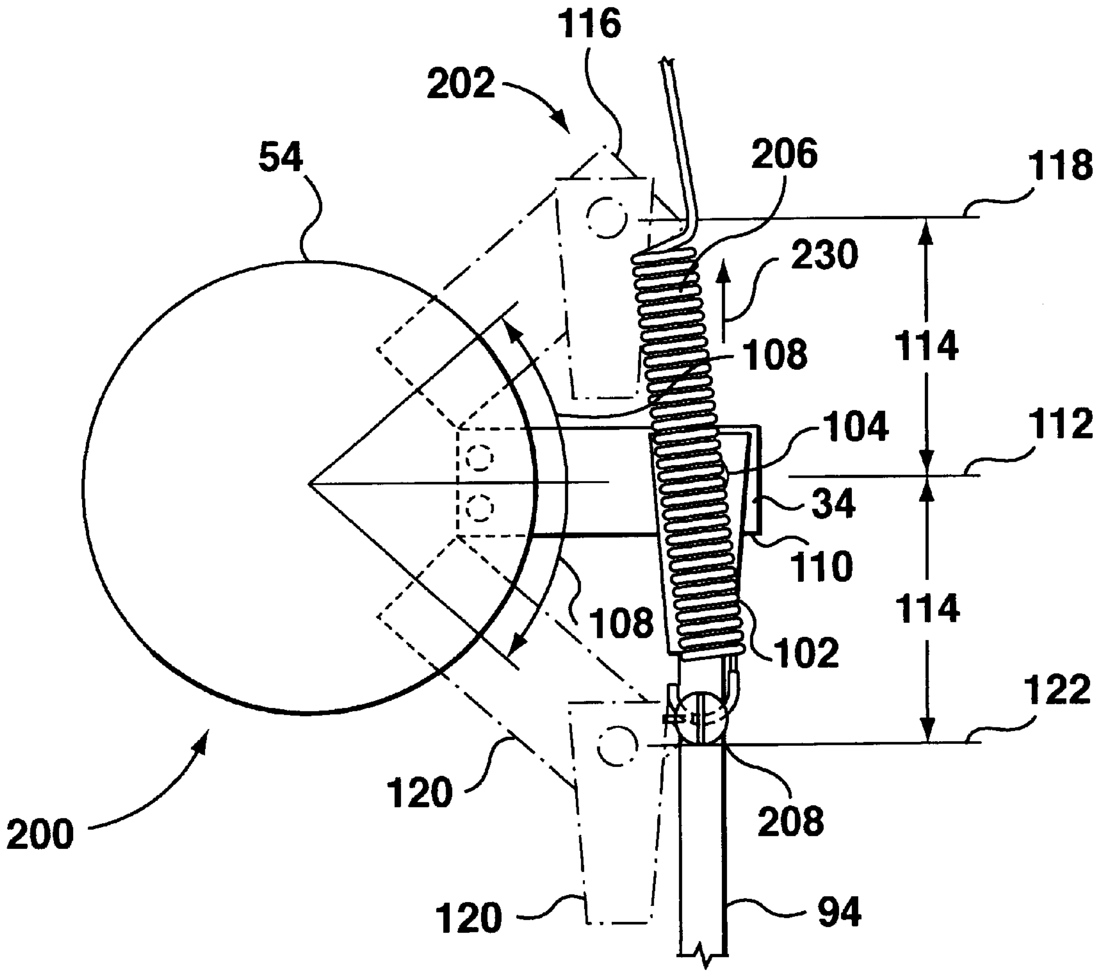
FIG. 10 is another side elevational view of the clutch arm centering assembly of FIG. 6.

Reference is next made to FIG. 10. FIG. 10 is identical to FIG. 4, except that centering assembly 202 is partially shown, and the same reference numerals are used to denote the relative positions and heights of clutch arm 34. Clutch arm 34 of clutch assembly 200 is shown in its central position 110 in solid outline. When clutch arm 34 is to be raised up to its maximum height 118, control system 52 rotates clutch housing 54 counterclockwise and mounting rod 220 (FIG. 8) slides up into mounting bracket 204 (FIG. 8). When clutch arm 34 is to be lowered down to its minimum height 122, control system 52 rotates clutch housing 54 with sufficient force to overcome the spring force 230 of spring 206. Spring 206 must be selected such that its spring force may be overcome by the force that control system 52 is able to generate to rotate clutch housing 54 in a clockwise direction.

When clutch 32 is in its disengaged state, spring 206 (and gravity) will hold clutch arm 34 at height 112. As a result, when clutch 32 is switched to its engaged state, clutch arm 34 may always be raised to height 118 or lowered to height 122. In this way, the problems of understroking when clutch arm 34 is raised and overstroking when clutch arm 34 is lowered are substantially reduced.

Although spring 206 has been described and illustrated as connected to drive rod 94, spring 206 may be connected to clutch 32, clutch arm 34, a different portion of drive rod 94 or valve arm 86 while still providing the function of holding clutch arm 34 in its central position 110 (FIG. 10) when valve arm 86 (FIG. 6) is in its neutral position.

Furthermore, spring 206 has been described and shown as a coil spring. Spring 206 may be any type of suitable spring and need not be mounted above clutch 32. For example, spring 206 may be replaced with a spring which is attached to clutch arm 34 from below. Such a spring may be normally extended and may be compressed when clutch arm 34 is lowered.

Figure 12:
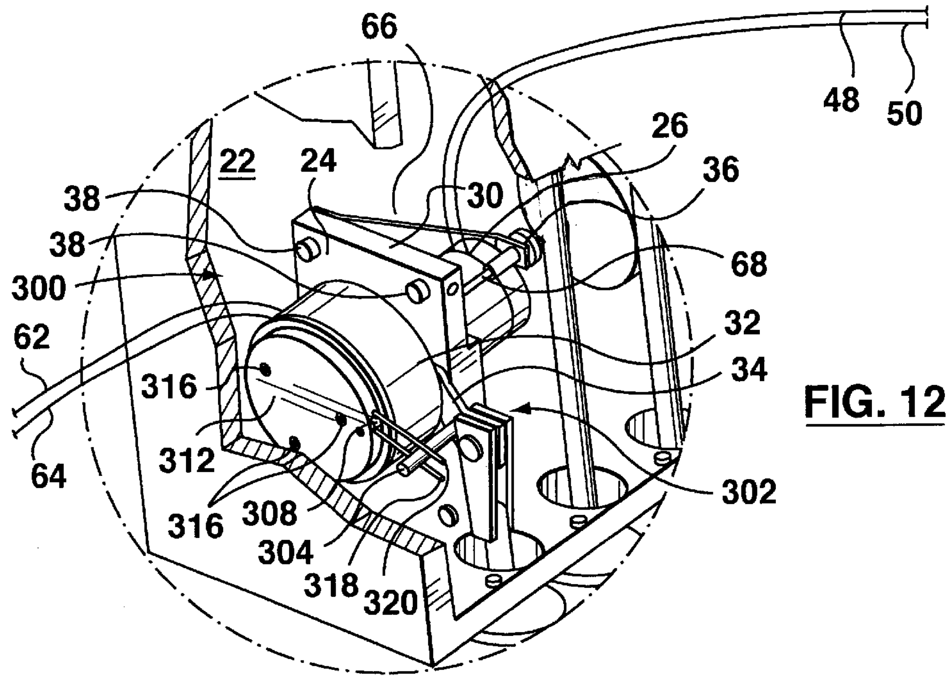
FIG. 12 is an enlarged view of a portion of FIG. 11.
Figure 11:
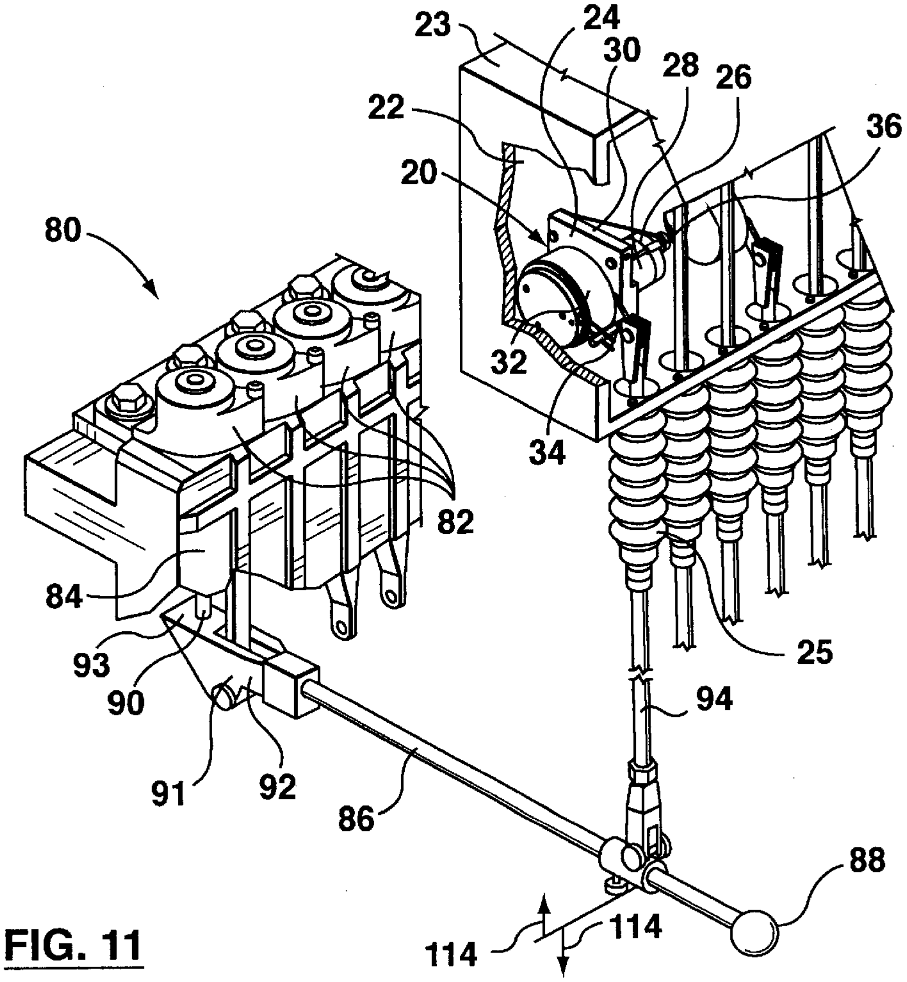
FIG. 11 is a perspective view of a clutch assembly incorporating a second embodiment of a clutch arm centering assembly according to the present invention.
Figure 13:
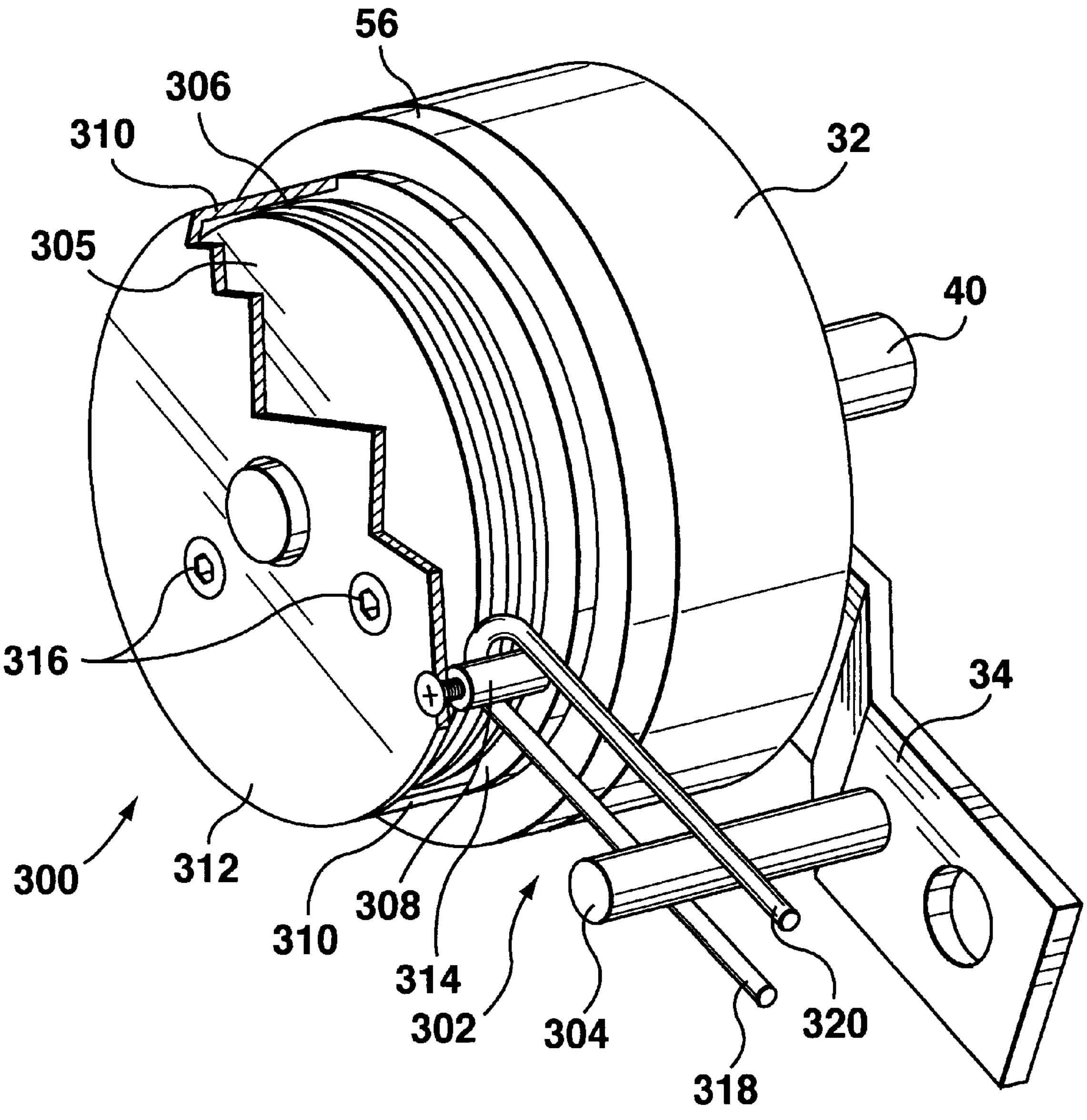
FIG. 13 is a perspective view of a the clutch arm centering assembly of FIG. 11.

Reference is next made to FIGS. 11, 12 and 13 which show a clutch assembly 300 equipped with a second embodiment of a clutch arm centering assembly 302. Clutch arm centering assembly 302 comprises a centering pin 304, a spring hub 305, a centering spring 306, a spring positioning pin 308, a spring housing 310 and a spring cover 312. Clutch assembly 300 is identical to prior art clutch assembly 20, except for the addition of clutch arm centering assembly 304. The components of clutch assembly 300 are identified by the same reference numerals as their counterparts in clutch assembly 20. Clutch assembly 300 is coupled to valve arm 86 of a piston valve 84 in the same manner as prior art clutch assembly 20 using devices 98, 102 and drive rod 94 (not shown in FIG. 13).

Centering pin 304 is fastened to clutch arm 34 along the longitudinal centre line of clutch arm 34 such that centering pin 304 extends parallel to the axis 60 (FIG. 3) of rotation of clutch housing 54. Spring hub 305 is a cylindrical member affixed to fixed plate 56. Centering spring 306 is a helical spring and is slideably positioned around spring hub 305. Spring housing 310 extends circumferentially around the spring hub 305, except for an opening 314. Spring housing 310 is spaced apart from spring hub 305 to allow centering spring 306 to expand and contract. Spring positioning pin 308 is a cylindrical tube and is positioned in the centre of opening 314. Spring positioning pin 308 is positioned such that it will be aligned with centering pin 304 when clutch 32 is disengaged and valve arm 86 is in its neutral position (as shown in FIG. 12). Spring cover 312 is fastened to fixed plate 56 through spring hub 305 by means of fasteners 316, which also hold spring 305 in place. Spring housing 310 and spring cover 312 cooperate to retain centering spring 306 in its position on clutch cover 65. Each end of centering spring 306 is formed into a biasing section 318, 320. Biasing section 318 extends radially from one side of spring positioning pin 308 past a corresponding side of centering pin 304. Biasing section 320 extends radially from the other side of spring positioning pin 308 past the corresponding side of centering pin 304. Centering spring 306 is compressed when it is positioned on clutch cover 65. As a result, biasing sections 318, 320 pull tightly against the sides of spring positioning pin 308. Centering spring 306 is selected to have sufficient force that biasing sections 318, 320 will be able to hold centering pin 304 in its central position 110 (FIGS. 14, 15) when valve arm 86 is not being operated in the direct manual operation mode or in the remote operation mode. However, centering spring 306 is selected such that it does not have sufficient force to prevent clutch arm 34 from being raised to its maximum height 118 (FIGS. 14, 15) or lowered to its minimum height 122 (FIGS. 14, 15) in the direct manual operation mode.

Spring hub 305, spring positioning pin 308 and spring cover 312 are fixedly attached to fixed plate 56 such that each of them rotates about axis 60 in fixed relation to fixed plate 56. When clutch 32 is engaged and fixed plate 56 is rotated in the remote operation mode, free plate 58, clutch housing 54, clutch arm 34 and centering spring 306 will also be rotated.

Figure 14:
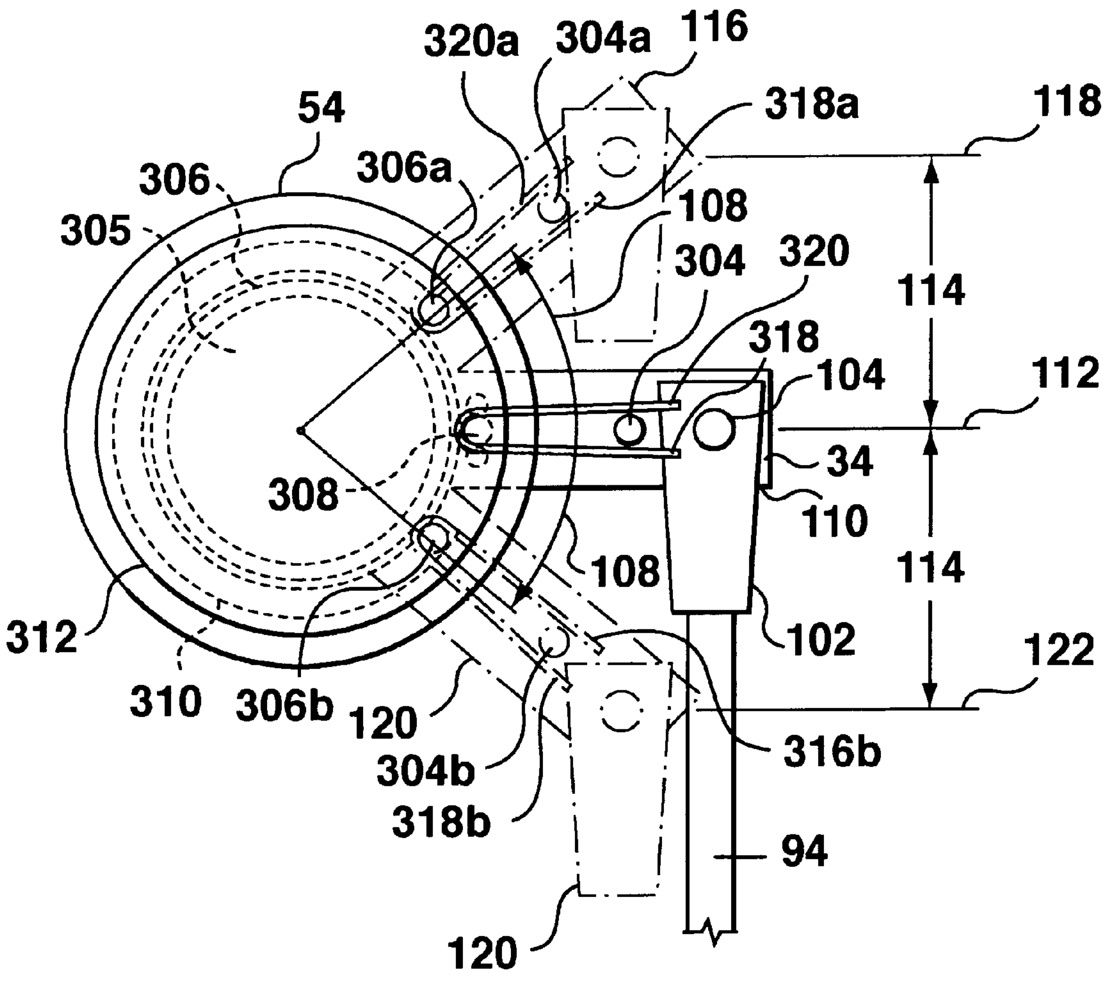
FIG. 14 is a side elevational view illustrating the operation of the clutch arm centering assembly of FIG. 11 in a remote operation mode.

Reference is next made to FIG. 14, which illustrates the operation of clutch assembly 300 and clutch arm centering assembly 302 when clutch assembly is operated in the remote operation mode. Clutch arm 34 is shown in solid outline in its central position 110. Biasing sections 318, 320 of centering spring 306 apply biasing forces against opposing sides of centering pin 304 to hold centering pin 304 is in alignment with spring positioning pin 308.

When clutch arm 34 is to be raised up to its maximum height 118 in the remote operation mode, control system 52 engages fixed plate 56 and free plate 58 and rotates fixed plate 56 in the counterclockwise direction, causing clutch housing 54, clutch arm 34, centering pin, spring hub 305, spring housing 310, spring cover 312, spring positioning pin 308 and centering spring 306 to rotate together about axis 60 in the counterclockwise direction. When clutch arm 34 is raised to position 116, centering pin 304 is in position 304*a* and biasing sections 316, 318 are in positions 316*a*, 318*a*.

When clutch arm 34 is to be lowered down to its minimum height 122 in the remote operation mode, control system 52 rotates fixed plate 56 in the clockwise direction, causing clutch housing 54, clutch arm 34, centering pin, spring hub 305, spring housing 310, spring cover 312, spring positioning pin 308 and centering spring 306 to rotate together about axis 60 in the clockwise direction. When clutch arm 34 is lowered to position 120, centering pin 304 is in position 304*b* and biasing sections 316, 318 are in positions 316*b*, 318*b*.

In the remote operation mode, centering pin 304 and centering spring 306 rotate together when fixed plate 56 and free plate 58 are first engaged and are then rotated by control system 52. As a result, clutch arm centering assembly 302 is entirely transparent during the remote operation mode. Control system 52 and motor 26 need not exert any force to overcome the spring tension of centering spring 306 and do not require any modification to operate clutch assembly 300, which is equipped with clutch arm centering assembly 302, in precisely the same manner as they operated with clutch assembly 20. In contrast, when clutch arm 34 of clutch assembly 200 (FIGS. 6–10) is lowered from its initial position 110, spring 206 of clutch arm centering 202 exerts a force opposing the force applied by motor 28. Control system 52 and motor 28 of clutch assembly 200 must accordingly be configured to overcome this opposing force.

Figure 15:
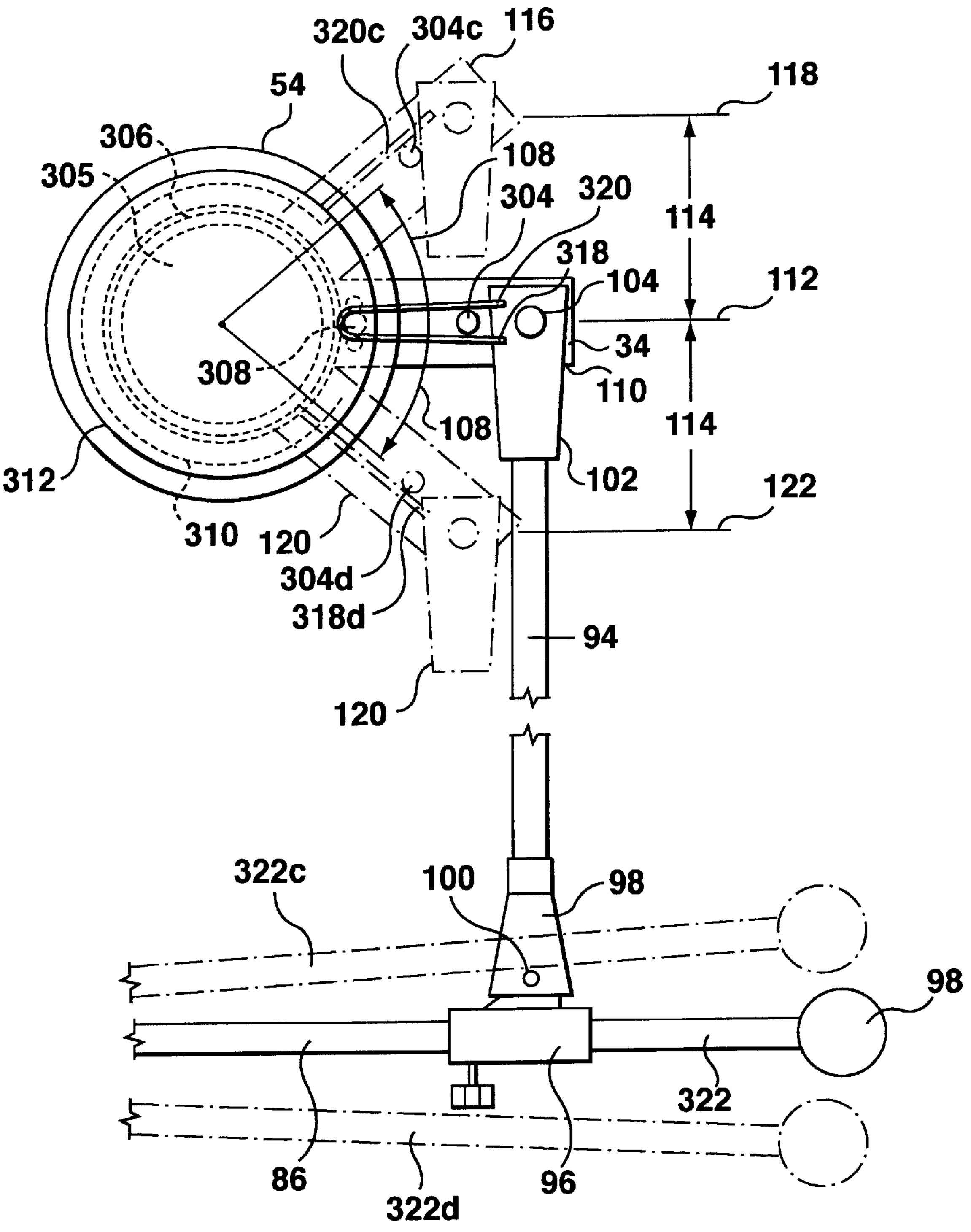
FIG. 15 is a side elevational view illustrating the operation of the clutch arm centering assembly of FIG. 11 in a direct manual operation mode.

Reference is next made to FIG. 15, which illustrates the operation of clutch assembly 300 and clutch arm centering assembly 302 in the direct manual operation mode. In FIG. 15, the same reference numerals are used to denote corresponding components and positions as those of FIG. 14. As before, when clutch arm 34 in position 110, it is held in alignment with spring positioning pin 308 by biasing sections 318, 320 of centering spring 306. When clutch arm 34 is in position 110, valve arm 86 is in position 322.

When clutch arm 34 is to be raised up to its maximum height 118 in the direct manual operation mode, an operator raises valve arm 86 up towards position 322*c* to lift clutch arm 34 with sufficient force to overcome the biasing force of biasing section 320 against centering pin 304. As clutch arm 34 is raised, centering pin 304 will force biasing section 320 upwards until, when clutch arm 34 is in position 116, centering pin 304 is in the position shown at 304*c* and biasing section 320 is in the position shown at 320*c*. At this time, biasing section 318 will continue to be held in its original position by spring positioning pin 308, fixed plate 56 has not been moved.

When clutch arm 34 is to be lowered down to its minimum height 122 in the direct manual operation mode, the operator lowers valve arm 86 down towards position 322*d* to lower clutch arm 34 with sufficient force to overcome the biasing force applied to centering pin 304 by biasing section 318. As clutch arm 34 is lowered, centering pin 304 will push biasing section 320 down until, when clutch arm 34 is in position 120, centering pin 304 is in the position shown at 304*d* and biasing section 318 is in the position shown at 318*d*.

When clutch 32 is disengaged, and when valve arm 86 is not being manipulated in the direct manual operation mode, biasing sections 318 and 320 will apply sufficient biasing forces to centering pin 304 to prevent clutch arm 34 from sagging, thereby eliminating the problems of understroking when clutch arm 34 is raised and overstroking when clutch arm 34 is lowered. In one embodiment of the present invention, centering spring 306 is selected so that biasing sections 318, 320 each apply a biasing force of between 2–3 inch pounds to centering pin 304. This biasing force is sufficient to hold clutch arm 34 in position 110 as the linkage between clutch arm 34 and valve arm 86 wears. However, this biasing force is not so great that an operator will not be able to apply sufficient force to handle 88 to overcome it. Preferably the biasing force will normally be less than 5 inch pounds.

While clutch arm centering assembly 302 provides the benefits of clutch arm centering assembly 202, it also has the added advantage that it actively holds clutch arm 34 in its central position 110 by biasing centering pin 304 from both its two opposing sides. In contrast, clutch arm centering assembly 202 only prevents clutch arm 34 from sagging and relies on gravity to prevent clutch arm 34 from rising upwards.

In addition, clutch arm centering assembly 302 is more compact than clutch arm centering assembly 202.

Clutch arm centering assembly 302 may be used in conjunction with a clutch that is mounted with its clutch arm extending vertically upwards or downwards or in any other direction. Clutch arm centering assembly 302 is also suitable for use with a clutch that is mounted such that its clutch housing rotates on a horizontal plane with its clutch arm moving from side to side to control another device.

Centering spring 306 may be replaced with a pair of springs, each having a single biasing section corresponding to biasing section 318 or 320. Each of the springs may be anchored separately to provide the same functionality as centering spring 306.

Clutch arm centering assembly 302 holds clutch arm 34 in its central position 110 at all times except when clutch assembly 300 is operated in either the remote operation mode or in the direct manual operation mode. As a result, the weight of clutch arm 34 is not applied to the linkage between clutch arm 34 and valve arm 86 consisting of drive rod 94, clevices 98, 102 and device pins 100, 104 except when valve arm 86 is actually being operated. This in turn reduces the weight applied to device 92, camming portion 93 and valve pin 90. When the crane on which clutch assembly 300 is transported, the reduced weight on each of these elements will result in reduced friction between them and reduced wear of each element. Although the use of clutch arm centering assembly 302 does not eliminate wear of these components, it reduces the wear to some extent. Clutch arm centering assembly 202 also offers this benefit.

Furthermore, both clutch arm centering assembly 202 and clutch arm centering assembly 302 are not limited to use with an electromechanical clutch, but may also be used in conjunction with a mechanical clutch or other type of clutch. For example, a clutch arm centerning assembly according to the present invention may be used with an electromagnetic clutch in which the free plate and fixed plate become magnetically engaged in response to a control signal when the device is used in the remote operation mode.

In addition, both clutch arm centering assembly 202 and clutch arm centering assembly 302 are not limited to use with piston valves but may be used with any type of valve.

These and other variations of the present invention which will be apparent to a person skilled in the art fall within the spirit and scope of the invention, which is limited only by the appended claims.

We claim:

1. A clutch having a hub, said clutch comprising:

(a) a clutch arm coupled to a valve arm of a valve, said valve arm having a neutral position in which said valve is closed and two operative positions, one on each side of said neutral position, said clutch arm having a first position corresponding to said neutral position and having second and third positions on opposite sides of said neutral position corresponding to said two operative positions respectively of said valve;

(b) a helical positioning spring mounted on said hub, said helical positioning spring have first and section spring arms for biasing said clutch arm to said first position; and (c) a fixed plate and a free plate, said fixed plate and said free plate having a common axis of rotation, said clutch arm being coupled to said free plate and said hub being coupled to said fixed plate, said clutch having an engaged state wherein said free plate rotates in fixed relation to said fixed plate and said clutch having a disengaged state wherein said free plate may rotate independently of said fixed plate, wherein said valve may be operated by a control system coupled to said clutch to control the state of said clutch and to control the rotation of said free plate when said clutch is in said engaged state and wherein said first and second spring arms move in fixed relation with said clutch arm when said clutch is operated by said control system.

2. Apparatus according to claim 1, wherein said clutch arm has a protrusion extending therefrom, said first spring arm extending on one side of said protrusion and said second spring arm extending on an opposing side of said protrusion to bias said clutch arm towards said first position.

3. Apparatus according to claim 2 wherein said valve may be operated by direct manipulation of said valve arm and wherein one of said first and second spring arms applies a first opposing force when said valve arm is manipulated in a first direction and the other of said first and second spring arms applies a second opposing force when said valve arm is manipulated in a second direction.

4. Apparatus according to claim 3 wherein said first opposing force and second opposing force are less than 5 inch pounds.

5. Apparatus according to claim 3 wherein said first opposing force and second opposing force are less than 3 inch pounds.

6. Apparatus according to claim 2 further including a positioning member located on said hub between said spring arms for locating said spring on said hub.

7. Apparatus according to claim 6 further including a cover mounted to said hub to retain said spring on said hub.

* * * * *